US012772278B2

(12) United States Patent
Kim et al.

(10) Patent No.: US 12,772,278 B2
(45) Date of Patent: Oct. 20, 2026

(54) ELECTRONIC DEVICE AND METHOD OF SELECTING MIPI FREQUENCY BY USING SAME

(71) Applicant: SAMSUNG ELECTRONICS CO., LTD., Suwon-si (KR)

(72) Inventors: Hyunsoo Kim, Suwon-si (KR); Seoyoung Park, Suwon-si (KR); Minwoo Kim, Suwon-si (KR); Songkyu Kim, Suwon-si (KR); Daehee Park, Suwon-si (KR); Dohoon Kim, Suwon-si (KR); Sangyong Kim, Suwon-si (KR); Youngsun Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 18/767,540

(22) Filed: Jul. 9, 2024

(65) Prior Publication Data

US 2024/0414752 A1 Dec. 12, 2024

Related U.S. Application Data

(63) Continuation of application No. PCT/KR2024/006291, filed on May 9, 2024.

(30) Foreign Application Priority Data

Jun. 7, 2023 (KR) ........................ 10-2023-0072915
Jun. 27, 2023 (KR) ........................ 10-2023-0082939

(51) Int. Cl.

*H04W 72/541* (2023.01)
*H04L 5/00* (2006.01)
*H04W 72/0453* (2023.01)

(52) U.S. Cl.

CPC ........... *H04W 72/541* (2023.01); *H04L 5/001* (2013.01); *H04W 72/0453* (2013.01)

(58) Field of Classification Search

CPC ........... H04W 72/541; H04W 72/0453; H04W 36/06; H04W 36/20; H04W 88/06; H04L 5/001; H04L 5/00; H04B 1/005

See application file for complete search history.

(56) References Cited

U.S. PATENT DOCUMENTS 7,761,057 B2 7/2010 Sreerama et al.
7,804,920 B2 9/2010 Deisher et al.
(Continued)

FOREIGN PATENT DOCUMENTS

KR 10-2021-0102372 A 8/2021
KR 10-2499068 B1 2/2023
(Continued)

OTHER PUBLICATIONS

International Search Report (PCT/ISA/210) issued by the International Searching Authority on Aug. 13, 2024 in corresponding International Application No. PCT/KR2024/006291.
(Continued)

*Primary Examiner* — Hashim S Bhatti
(74) *Attorney, Agent, or Firm* — Sughrue Mion, PLLC

(57) ABSTRACT

A method for selecting a mobile industry processor interface (MIPI) frequency, includes: identifying first interference data representing an interference amount between each of multiple communication frequency bands and each of MIPI frequencies; identifying a weight corresponding to each of the MIPI frequencies, based on a communication parameter related to a wireless communication for each of the multiple communication frequency bands; updating the first interference data for each of the MIPI frequencies, based on the identified weight; and selecting the MIPI frequency for
(Continued)

operating an MIPI interface, based on the updated first interference data.

20 Claims, 9 Drawing Sheets

(56) References Cited

U.S. PATENT DOCUMENTS

| | | | | |
|---|---|---|---|---|
| 8,412,105 | B2 | 4/2013 | Dorsey et al. | |
| 10,630,396 | B2 | 4/2020 | Zhuang et al. | |
| 11,140,381 | B1 | 10/2021 | Zhang et al. | |
| 11,570,348 | B2 | 1/2023 | Wang et al. | |
| 11,701,580 | B2 | 7/2023 | Tang et al. | |
| 2017/0171366 | A1 | 6/2017 | Liu et al. | |
| 2018/0234191 | A1 | 8/2018 | Zhuang et al. | |
| 2021/0165441 | A1 | 6/2021 | Kim et al. | |
| 2021/0220731 | A1 | 7/2021 | Tang et al. | |
| 2021/0250104 | A1* | 8/2021 | Tang | H04B 15/02 |
| 2021/0266721 | A1* | 8/2021 | Tang | H04W 72/02 |

FOREIGN PATENT DOCUMENTS

| | | | |
|---|---|---|---|
| WO | 2018/205829 | A1 | 11/2018 |
| WO | 2019/112230 | A1 | 6/2019 |

OTHER PUBLICATIONS

Extended European Search Report issued Mar. 6, 2026 by the European Patent Office for EP Patent Application No. 24819493.8.

* cited by examiner

FIG. 4A

410 Step 1

401

| RAT | Band enum | | Frem | End | MIPI frdq : Rating matr | A | B | C |
|---|---|---|---|---|---|---|---|---|
| LTE | BAND_091_LB01 | | 0 | 113 | 000000020 | 000 | 000 | 020 |
| LTE | BAND_091_LB01 | | 114 | 227 | 000000000 | 000 | 000 | 000 |
| LTE | BAND_091_LB01 | | 228 | 294 | 000000000 | 020 | 000 | 000 |
| LTE | BAND_092_LB02 | | 800 | 1129 | 000000000 | 000 | 000 | 000 |
| LTE | BAND_092_LB02 | | 1130 | 1199 | 000000200 | 000 | 000 | 200 |
| LTE | BAND_093_LB03 | | 1200 | 1736 | 000000000 | 000 | 000 | 000 |
| LTE | BAND_093_LB03 | | 1737 | 1876 | 000000020 | 000 | 000 | 020 |
| LTE | BAND_093_LB03 | | 1877 | 1949 | 000000000 | 000 | 000 | 000 |
| LTE | BAND_095_LB05 | | 2400 | 2486 | 000000030 | 000 | 000 | 030 |
| LTE | BAND_095_LB05 | | 2487 | 2849 | 000000000 | 000 | 000 | 000 |
| LTE | BAND_097_LB07 | | 2750 | 2772 | 010010000 | 010 | 010 | 000 |
| LTE | BAND_097_LB07 | | 2773 | 2854 | 00010000 | 000 | 010 | 000 |

411 → A

412 → B

Step 2 420

413 → C

ELECTRONIC DEVICE AND METHOD OF SELECTING MIPI FREQUENCY BY USING SAME

CROSS-REFERENCE TO RELATED APPLICATIONS

This application is a by-pass continuation application of International Application No. PCT/KR2024/006291, filed on May 9, 2024, which is based on and claims priority to Korean Patent Application Nos. 10-2023-0072915, filed on Jun. 7, 2023, and 10-2023-0082939, filed on Jun. 27, 2023, in the Korean Intellectual Property Office, the disclosures of which are incorporated by reference herein their entireties.

BACKGROUND

1. Field

The disclosure relates to an electronic device and a method of selecting a MIPI frequency by using the electronic device.

2. Description of Related Art

An electronic device of a wireless communication may transmit or receive communication signals, based on a configured communication frequency band, and thus, may perform data transmission or reception with a base station. The electronic device may select a mobile industry processor interface (MIPI) frequency in relation to operations of internal elements (e.g., a display and a camera). For example, in selecting a MIPI frequency (e.g., a MIPI clock frequency), the electronic device may consider an 'evolved UMTS terrestrial radio access (E-UTRA) absolute radio frequency channel number' (EARFCN) of a primary component carrier (PCC) band in a 'long term evolution' (LTE) carrier aggregation (CA) condition, and consider an EARFCN of an anchor PCC band in an 'evolved non-standalone dual connectivity' (EN-DC) condition.

The electronic device may select one MIPI frequency from among multiple MIPI frequencies to avoid interference (e.g., noise) occurring between the MIPI frequency and the communication frequency band. The electronic device may select the MIPI frequency in consideration of whether interference occurs according to the communication frequency band, and may at least partially drive the internal elements, based on the selected MIPI frequency.

The information described above may be provided as a related art for helping understanding of the disclosure. No assertion or determination is made as to whether any of the contents described above could be applied as prior art related to the disclosure.

In a situation where multiple communication frequency bands are simultaneously used (e.g., carrier aggregation (CA), EN-DC, or LTE+WIFI) and a particular MIPI frequency is selected, communication performance may be degraded in a frequency band (e.g., a secondary component carrier (SCC) band) other than a PCC band. For example, a MIPI frequency (selected to avoid interference, based on the PCC band) may incur significant interference in the SCC band.

According to an embodiment, an electronic device may select a MIPI frequency, based on a condition that optimal communication performance is implemented, in consideration of at least one of a noise-related characteristic (e.g., noise phenomenon caused by multiplied frequency), an RF frequency-related characteristic, a characteristic depending on antenna placement position, and an RF bandwidth (BW)-related characteristic. Provided is an electronic device that improves transmission or reception performance and data throughput (T-PUT) of communication under a condition where the communication, based on multiple communication frequency bands is performed.

The technical aspect to be achieved herein is not limited to that mentioned above, and other technical aspects that are not mentioned above may be clearly understood to a person of ordinary skill in the art to which this disclosure belongs based on the description provided below.

SUMMARY

According to an aspect of the disclosure, an electronic device includes: a communication circuit configured to perform a wireless communication using multiple communication frequency bands; at least one memory configured to comprise information related to multiple mobile industry processor interface (MIPI) frequencies; at least one processor operatively connected to the communication circuit and the at least one memory; and an internal circuit connected to the at least one processor via a MIPI interface, wherein the at least one processor is configured to: identify first interference data representing an interference amount between each of the multiple communication frequency bands and each of the MIPI frequencies; identify a weight corresponding to each of the multiple MIPI frequencies, based on a communication parameter related to the wireless communication for each of the multiple communication frequency bands; update the first interference data for each of the MIPI frequencies, based on the identified weight; and select a MIPI frequency for operating the MIPI interface, based on the updated first interference data.

According to an aspect of the disclosure, a method for selecting a mobile industry processor interface (MIPI) frequency, includes: identifying first interference data representing an interference amount between each of multiple communication frequency bands and each of MIPI frequencies; identifying a weight corresponding to each of the MIPI frequencies, based on a communication parameter related to a wireless communication for each of the multiple communication frequency bands; updating the first interference data for each of the MIPI frequencies, based on the identified weight; and selecting the MIPI frequency for operating an MIPI interface, based on the updated first interference data.

According to an embodiment, in a communication environment (e.g., CA, EN-DC, or LTE+WIFI) in which multiple communication frequency bands are simultaneously used, an electronic device may select an optimal MIPI frequency among multiple MIPI frequencies to minimize interference (e.g., noise) caused by MIPI frequency selection. For example, the electronic device may select a MIPI frequency that would minimize performance degradation caused by interference in the communication environment. According to an embodiment, an electronic device may select an optimal MIPI frequency, based on a condition that transmission or reception performance and data throughput (T-PUT) of communication are improved.

According to an embodiment, in a communication environment in which multiple communication frequency bands are simultaneously used, an operation for selecting an optimal MIPI frequency may be provided so as to reduce occurrence of interference. According to an embodiment, an MIPI frequency for implementing optimal communication performance may be selected according to a situation where a communication situation is changing. Optimal communication performance corresponding to a communication environment may be provided. Communication efficiency may be reinforced.

Effects which are acquirable by the disclosure are not limited to the effects described above, and other effects that have not been mentioned may be clearly understood by a person of ordinary skill in the art to which the disclosure belongs, from the following description.

BRIEF DESCRIPTION OF THE DRAWINGS

In relation to the description of drawings, the same or similar elements may be indicated by the same or similar reference signs. The above and other aspects, features, and advantages of certain embodiments of the disclosure will be more apparent from the following description taken in conjunction with the accompanying drawings, in which:

FIG. 4A illustrates an example of a first process of selecting a MIPI frequency having an excellent communication performance in multiple communication frequency bands according to an embodiment of the disclosure;

DETAILED DESCRIPTION

Figure 1:
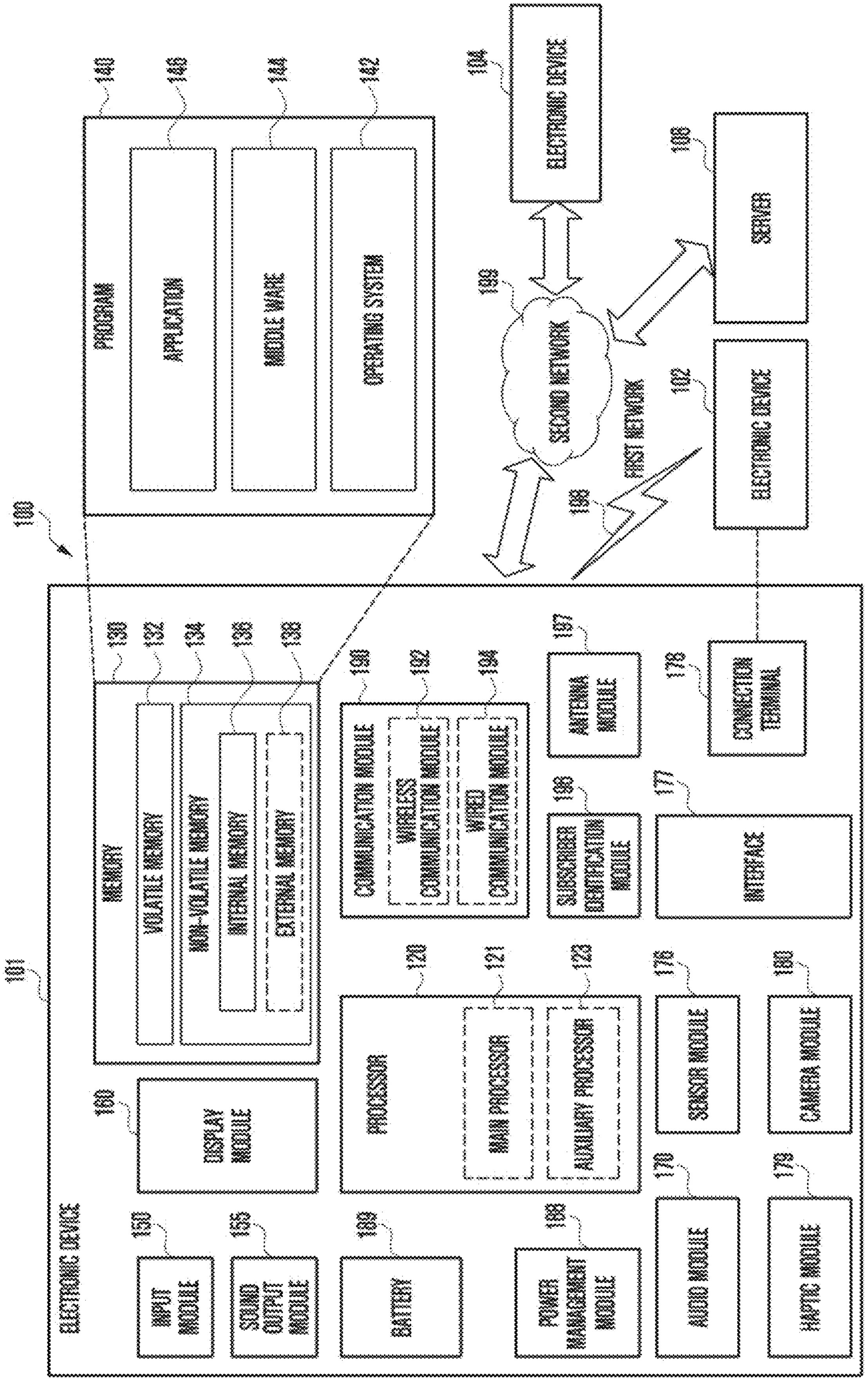
FIG. 1 illustrates an electronic device in a network environment according to an embodiment of the disclosure; disclosure.

Hereinafter, embodiments of the disclosure will be described in detail with reference to the drawings so that a person having common knowledge in the technical field to which the disclosure belongs are able to readily carry out the disclosure. However, the disclosure may be implemented in any of various forms, and should not be construed as being limited to the embodiments set forth herein. In relation to the description of drawings, the same or similar elements may be indicated by the same or similar reference signs. In addition, in the drawings and related descriptions, description for well-known functions and configurations may be omitted of clarity and briefness.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
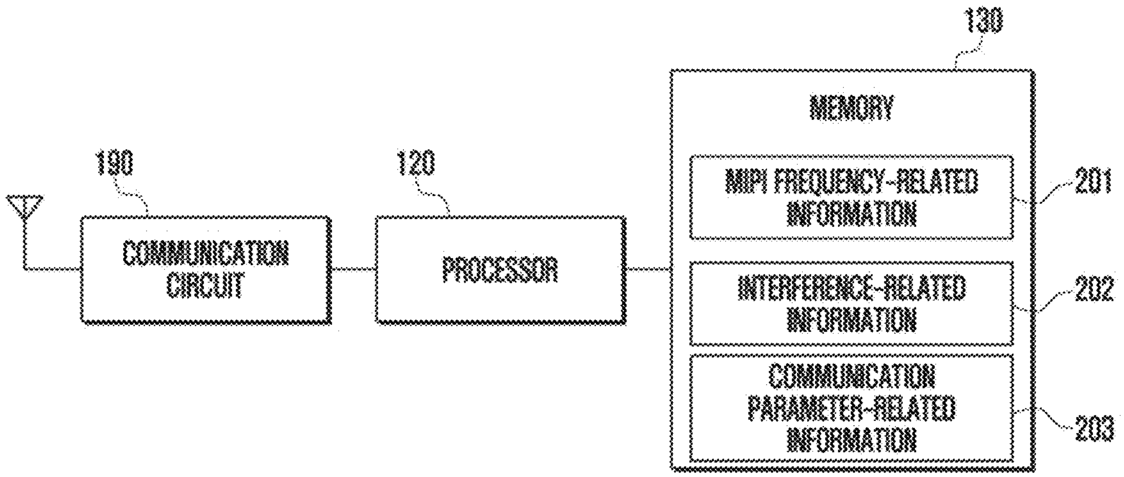
FIG. 2 illustrates an electronic device according to an embodiment of the disclosure.

FIG. 2 illustrates an electronic device according to an embodiment of the disclosure.

An electronic device 101 (e.g., the electronic device 101 in FIG. 1) of FIG. 2 may be at least partially similar to the electronic device 101 in FIG. 1, or may further include other embodiments of the electronic device. The electronic device 101 may support communication based on multiple communication frequency bands, and may use multiple communication frequency bands (e.g., PCC band and SCC band) to simultaneously perform multiple communications. The electronic device 101 may select one MIPI frequency from among multiple MIPI frequencies to implement optimal communication performance while multiple communications are being performed. For example, the electronic device 101 may, when operating (e.g., activating) internal elements (e.g., a display and a camera), select a particular MIPI frequency, and operate a corresponding internal element, based on the selected MIPI frequency. The electronic device 101 may use different MIPI frequencies according to the types of internal elements to operate a corresponding internal element.

According to an embodiment, the electronic device 101 may identify an interference amount (e.g., noise level) when a particular MIPI frequency is selected from among multiple MIPI frequencies, with respect to each communication frequency included in a communication frequency band. For example, if a first MIPI frequency is selected to correspond to a first communication frequency, the electronic device 101 may identify that a first interference amount has occurred, and if a second MIPI frequency is selected to correspond to the first communication frequency, the electronic device may identify that a second interference amount has occurred. The electronic device 101 may numerically identify a noise level occurring in a communication frequency band when a particular MIPI frequency is selected.

According to an embodiment, the electronic device 101 may identify an interference amount corresponding to each communication frequency, based on a selected particular MIPI frequency, and reflect a weight on the identified interference amount by considering various communication situations together. For example, the electronic device 101 may generate an interference amount table in a form of a table, based on an interference amount on which a weight has been reflected. According to an embodiment, the electronic device 101 may select a particular MIPI frequency from among multiple MIPI frequencies, based on the generated interference amount table. The electronic device 101 may select an optimal MIPI frequency so that communication performance degradation caused by interference is relatively low. According to an embodiment, in a communication environment where multiple communication frequency bands are simultaneously used, the electronic device 101 may select a MIPI frequency minimizing communication performance degradation caused by interference. The electronic device may select an optimal MIPI frequency, based on a condition that transmission or reception performance and data throughput (T-PUT) of communication are improved.

Referring to FIG. 2, the electronic device 101 may include a processor (e.g., the processor 120 in FIG. 1), a memory (e.g., the memory 130 in FIG. 1), and a communication circuit (module) 109, which may correspond to the communication module 190 in FIG. 1. For example, the electronic device 101 may be operatively or electrically connected to the communication circuit 190, and may perform communication based on multiple communication frequency bands via the communication circuit 190. The electronic device 101 may substantially simultaneously perform multiple communications.

According to an embodiment, the processor 120 of the electronic device 101 may execute a program (e.g., the program 140 in FIG. 1) stored in the memory 130 to control at least another element (e.g., a hardware or software element), and perform various data processing or calculation. For example, the processor 120 may identify an interference amount between a communication frequency band and a particular MIPI frequency, based on pieces of information (e.g., MIPI frequency-related information 201, interference-related information 202, and communication parameter-related information 203) related to a communication environment, which are stored in the memory 130. The processor 120 may select one MIPI frequency from among multiple MIPI frequencies, based on a condition that communication performance degradation caused by the identified interference amount is minimized, and may use the selected MIPI frequency to operate at least one element (e.g., the display module 160 in FIG. 1 and the camera module 180 in FIG. 1). According to an embodiment, the processor 120 may be operatively, functionally, and/or electrically connected to the memory 130 and/or the communication circuit 190. Throughout the disclosure, the processor 120 may correspond to at least one processor (one or more processors). Also, the memory 130 may correspond to at least one memory (one or more memories).

According to an embodiment, the processor 120 may be included in a control circuit for controlling an element included in the display module 160. For example, the processor 120 may be included as a partial configuration (e.g., image processor) of the display module 160, and may at least partially perform a program stored in the memory 130.

According to an embodiment, the memory 130 may store information (e.g., the MIPI frequency-related information 201) related to multiple MIPI frequencies, which are selectable in the electronic device 101. For example, the processor 120 may, when operating (e.g., activating) internal elements (e.g., the display module 160 and the camera module 180), select one MIPI frequency from among multiple MIPI frequencies, based on the MIPI frequency-related information 201. For example, the MIPI frequency-related information 201 may include information (e.g., weight information) related to a multiplied component (e.g., ¼ component, ½0 component, odd-multiplied component, or even-multiplied component) of a particular MIPI frequency.

According to an embodiment, the memory 130 may store information (e.g., the interference-related information 202) related to an interference phenomenon occurring between a communication frequency band and a MIPI frequency. For example, if a particular MIPI frequency is selected, an interference phenomenon may occur between the selected MIPI frequency and each communication frequency included in a communication frequency band. The interference-related information 202 may include interference data obtained by converting, into a numerical value, a caused interference phenomenon, based on the selected MIPI frequency and a communication frequency. The processor 120 may implement, in the form of a table, interference data corresponding to a selected MIPI frequency and a communication frequency, and store the tabular interference data (e.g., an interference amount table) in the memory 130 as the interference-related information 202.

According to an embodiment, the memory 130 may store the communication parameter-related information 203 depending on a communication environment. For example, the communication parameter-related information 203 may include weight information related to an RF frequency band (e.g., low frequency band, mid frequency band, or high frequency band). For example, a weight of about 3 may be configured for a low frequency band, a weight of about 2 may be configured for a mid-frequency band, and a weight of about 1 may be configured for a high frequency band. As another example, the communication parameter-related information 203 may include information related to an antenna port map representing an antenna arrangement structure of the electronic device 101. For example, an interference phenomenon occurring between a communication frequency and a MIPI frequency may be determined based on a first position of an antenna corresponding to a communication frequency band, and a second position of an element (e.g., the camera module 180) corresponding to the MIPI frequency. A distance between the first position and the second position becomes narrower, the noise level corresponding to the interference phenomenon may become higher. As the distance becomes farther, the noise level may become lower. According to an embodiment, the processor 120 may determine (configure) a high weight because the closer the distance between the first position and the second position, the higher the noise level. The processor 120 may configure a low weight since the farther the distance between the first position and the second position, the lower the noise level. As another example, the communication parameter-related information 203 may include information (e.g., a strong electric field or a weak electric field) related to a current communication state. According to an embodiment, if a communication environment is a strong electric field, an interference phenomenon occurring between a communication frequency and a MIPI frequency may not significantly affect communication performance. For example, if a communication environment is a strong electric field, an interference phenomenon (e.g., noise level) may not be considered. On the contrary, if a communication environment is a weak electric field, an interference phenomenon occurring between a communication frequency and a MIPI frequency may (relatively significantly) affect communication performance. The processor 120 may configure about 0 as a weight in response to a communication environment being a strong electric field, and configure about 1 as a weight in response to the communication environment being a weak electric field. According to an embodiment, the electronic device 101 may, when the communication environment is a weak electric field, identify an interference phenomenon occurring between a communication frequency and a MIPI frequency, and apply a weight for a selected MIPI frequency. According to an embodiment, the electronic device 101 may identify interference data between a communication frequency and a MIPI frequency in response to a communication environment being a weak electric field.

According to an embodiment, the processor 120 may at least partially update the interference-related information 202, based on the MIPI frequency-related information 201 and the communication parameter-related information 203 stored in the memory 130. For example, the interference-related information 202 may include an interference amount (e.g., noise level) when a communication frequency and a MIPI frequency are simultaneously used, based on multiple communication frequencies and multiple MIPI frequencies. The interference-related information 202 may include interference amount data implemented in the form of a table. The processor 120 may store the tabular interference data (e.g., an interference amount table) in the memory 130 as the interference-related information 202.

According to an embodiment, the communication circuit 190 may include at least one antenna corresponding to multiple communication frequency bands, and simultaneously perform multiple communications, based on the multiple communication frequency bands. For example, the processor 120 may use the at least one antenna to communicate with an external electronic device (e.g., a server device or a base station), based on multiple communication frequency bands. The communication circuit 190 may include a circuit structure electrically connected to the at least one antenna.

According to an embodiment, the electronic device 101 may select a MIPI frequency for operating at least one of internal elements, while performing multiple communications based on the at least one antenna via the communication circuit 190. The electronic device 101 may use the selected MIPI frequency to operate at least one internal element. For example, an individual MIPI frequency may be configured for each of the at least one internal element. The electronic device 101 may use a first MIPI frequency to operate a first element (e.g., the display module 160), and use a second MIPI frequency to operate a second element (e.g., the camera module 180). According to an embodiment, the electronic device 101 may select a MIPI frequency for operating at least element, while performing multiple communications based on multiple communication frequency bands. According to an embodiment, in selecting an MIPI frequency, the electronic device may select one MIPI frequency from among multiple MIPI frequencies, based on a condition that performance degradation of communication being performed (e.g., communication based on multiple communication frequency bands) is minimized. According to an embodiment, when one MIPI frequency is selected from among multiple MIPI frequencies, the electronic device 101 may identify an interference amount table corresponding to multiple communication frequency bands.

According to an embodiment, the electronic device 101 may identify a noise level (e.g., interference amount) in each communication frequency level when a particular MIPI frequency is selected from among multiple MIPI frequencies. For example, the electronic device 101 may record a noise level (e.g., magnitude) for each communication frequency band in the form of a table type (e.g., an interference amount table), and store the interference amount table in the memory (e.g., the memory 130 in FIG. 1).

According to an embodiment, MIPI frequencies related to operation of internal elements may be differently configured according to the internal elements (e.g., a module, a VTCAM, a wide CAM, an ultra-wide CAM, a tele CAM, and a display). For example, the electronic device 101 may use a first MIPI frequency to operate a display, and use a second MIPI frequency to operate a particular camera (e.g., wide CAM). The electronic device 101 may individually manage an interference amount table according to the type of an internal element to be operated. According to an embodiment, the electronic device 101 may independently generate, for each internal element, an interference amount table depending on selection of a MIPI frequency, and may store at least one interference amount table in the memory 130.

According to an embodiment, in generating an interference amount table, the electronic device 101 may reflect weights, based on the characteristic of noise. For example, the amount of incurred noise may be different according to a multiplied component of a MIPI frequency. A $\frac{1}{4}$ component of a MIPI frequency has a relatively high noise level (e.g., magnitude) and thus may have a significant impact on communication performance, whereby the communication performance may be significantly degraded. A $\frac{1}{20}$ component of a MIPI frequency has a relatively low noise level and thus may have a small impact on communication performance, whereby degradation in the communication performance may be relatively small. In comparison between a $\frac{1}{4}$ component and a $\frac{1}{20}$ component of a MIPI frequency, the $\frac{1}{4}$ component has a more significant impact on the change in communication performance, compared to the $\frac{1}{20}$ component, and thus a weight for the $\frac{1}{4}$ component may be configured to be relatively higher than that for the $\frac{1}{20}$ component.

In another embodiment, noise levels of a MIPI frequency and a derivative component (e.g., even-multiplied value or odd-multiplied value) may be differently measured. For example, if a noise level corresponding to an even-multiplied value among multiplied components is relatively higher than a noise level corresponding to an odd-multiplied value, the electronic device 101 may configure a relatively high weight for the even-multiplied value having a relatively high noise level. The electronic device 101 may configure a relatively low weight for the odd-multiplied value having a relatively low noise level. According to an embodiment, the electronic device 101 may identify noise levels related to MIPI frequencies, and configure a weight to be applied to each MIPI frequency, based on the identified noise levels. The electronic device 101 may configure a relatively high weight for an MIPI frequency, the noise level of which is measured to be relatively high.

According to an embodiment, in generating an interference amount table, the electronic device 101 may apply different weights according to the characteristic of noise so that an avoidance priority is determined depending on a noise level. For example, if a weight of about 100 is applied to a MIPI frequency at which the relatively highest noise level is generated, a weight of about 10 may be applied to a ¼ component of the MIPI frequency and a weight of about 1 may be applied to a 1/20 component of the MIPI frequency. A relatively higher noise level may occur at a ¼ component of a MIPI frequency compared to a 1/20 component thereof, and thus a weight applied to a ¼ component of a MIPI frequency may be configured to be relatively greater than that applied to the 1/20 component of the MIPI frequency. A weight of multiplying about 2 may be reflected on an even-multiplied value among ¼ components of a MIPI frequency, whereby a weight of about 20 is applied, and a weight of multiplying about 1 may be reflected on an odd-multiplied value whereby a weight of about 10 is applied. For example, a first weight (e.g., about 2 times) may be configured for a MIPI frequency of an event-multiplied value, and a second weight (e.g., about 1 time) may be configured for a MIPI frequency of an odd-multiplied value. The processor 120 may identify noise levels of multiple MIPI frequencies and derivative components (e.g., even-multiplied value, odd-multiplied value, and communication parameter), determine (configure) a first weight corresponding to an even-multiplied value, and determine (configure) a second weight corresponding to an odd-multiplied value.

According to an embodiment, an interference amount table may reflect a weight according to the characteristic of noise, and may be updated according to a configured period. The electronic device 101 may identify a noise level according to selection of a MIPI frequency, based on an interference amount table, and may determine a MIPI frequency having a low noise level (e.g., having high communication efficiency or having excellent communication performance).

According to an embodiment, in generating an interference amount table, the electronic device 101 may reflect weights, based on the magnitude of a communication frequency. For example, in a low frequency band, a relatively higher noise level may occur compared to in a high frequency band. Occurrence of a higher noise level may imply affecting a relatively more significant bad impact on communication performance, which means the greater degradation of the communication performance. The electronic device may reflect a weight of about three (3) to correspond to a low frequency band, reflect a weight of about two (2) to correspond to a mid-frequency band, and reflect a weight of about one (1) to correspond to a high frequency band.

According to an embodiment, in generating an interference amount table, the electronic device 101 may reflect weights, based on an antenna port map representing an antenna arrangement structure. For example, if an element corresponding to a MIPI frequency is the camera module 180, the communication performance of a first antenna disposed relatively close to the camera module 180 may be relatively significantly degraded due to an interference phenomenon caused by the MIPI frequency. On the contrary, the communication performance of a second antenna disposed relatively far away from the camera module 180 may be relatively slightly degraded due to an interference phenomenon caused by the MIPI frequency. The processor 120 may determine (configure) a first weight reflected on a communication frequency of the first antenna, to be relatively greater than a second weight reflected on a communication frequency of the second antenna. The processor 120 may determine (configure) different weights reflected on communication frequencies of respective antennas according to the antenna placement position, and generate an interference amount table reflecting the weights.

According to an embodiment, the electronic device 101 may select a particular MIPI frequency minimizing communication performance degradation from among multiple MIPI frequencies, based on an interference amount table stored in the memory 130. The electronic device 101 may operate one element by using the selected one MIPI frequency, and minimize degradation of the communication performance based on a communication frequency band.

According to an embodiment, the electronic device 101 may manage an interference amount table to be updated according to a configured time interval. The electronic device 101 may continuously update an interference amount table, and implement optimal communication performance in a current communication state. For example, if the electronic device 101 is continuously used in a particular communication environment, the electronic device 101 may update an interference amount table to implement optimal communication performance, based on the particular communication environment. According to an embodiment, the electronic device 101 may update an interference amount table in response to a configured condition (e.g., if the electronic device 101 is a foldable electronic device, a condition where a folding operation or an unfolding operation occurs, or if the electronic device 101 is a rollable electronic device, a condition where a rolling-in operation or a rolling-out operation occurs). For example, the electronic device 101 may configure a condition for updating an interference amount table, based on various situations where a communication service is provided. The electronic device 101 may update an interference amount table in response to occurrence of a particular situation according to a configured condition. The electronic device 101 may implement optimal communication performance, based on the updated interference amount table.

According to an embodiment, the electronic device 101 may identify a MIPI frequency generating a relatively maximum degradation of communication performance in multiple communication frequency bands, based on an interference amount table stored in the memory 130, and may exclude the identified MIPI frequency from a selected candidate group. For example, the electronic device 101 may identify degrees of degradation of communication performance corresponding to respective MIPI frequencies included in a selected candidate group, and exclude an MIPI frequency causing relatively substantial degradation of the communication performance from the selected candidate group one by one. For example, when one MIPI frequency remains in the selected candidate group, the electronic device 101 may select the one remaining MIPI frequency, and operate at least one element by using the selected MIPI frequency.

According to an embodiment, an electronic device (e.g., the electronic device 101 in FIG. 1) may include a communication circuit (e.g., the communication module 190 in FIG. 2) configured to perform wireless communication, based on multiple communication frequency bands, a memory (e.g., the memory 130 in FIG. 2) configured to include information related to multiple MIPI frequencies, a processor (e.g., the processor 120 in FIG. 2) operatively connected to the communication circuit and the memory, and an internal circuit connected to the processor 120 via a MIPI interface. The processor 120 may identify first interference data representing an interference amount between each of the multiple communication frequency bands and each of the MIPI frequencies, identify a weight corresponding to each of the multiple MIPI frequencies, based on a communication parameter related to wireless communication for each of the multiple communication frequency bands, update the first interference data for each of the MIPI frequencies, based on the identified weight, and select a MIPI frequency for operating the MIPI interface, based on the first interference data updated based on the weight.

According to an embodiment, the processor 120 may identify a multiplied component corresponding to each of the multiple MIPI frequencies, identify a weight configured to correspond to the identified multiplied component, and identify the first interference data to which the configured weight has been applied based on a communication frequency band corresponding to the multiplied component.

According to an embodiment, the processor 120 may apply a relatively greater weight based on a relatively high communication frequency band corresponding to the multiplied component. According to an embodiment, the processor 120 may be further configured to: identify a first multiplied component corresponding to a first MIPI frequency of the multiple MIPI frequencies; identify a second multiplied component corresponding to a second MIPI frequency of the multiple MIPI frequencies; and apply a first weight, based on a first communication frequency band corresponding to the first multiplied component, wherein the first multiplied component is greater than the second multiplied component, and wherein the first weight is greater than a second weight to be applied based on a second communication frequency band corresponding to the second multiplied component.

According to an embodiment, the processor 120 may identify an even-multiplied value and an odd-multiplied value included in the multiplied component, identify a first weight configured based on the identified even-multiplied value and a second weight configured based on the identified odd-multiplied value, and apply the first weight to correspond to a first communication frequency band corresponding to the even-multiplied value and apply the second weight to correspond to a second communication frequency band corresponding to the odd-multiplied value.

According to an embodiment, the first interference data may include a noise level interfering between each of the multiple communication frequency bands and each of the MIPI frequencies.

According to an embodiment, the processor 120 may generate an interference amount table in a form of a table, based on each of the communication frequencies and each of the MIPI frequencies, and identify the first interference data, based on the interference amount table.

According to an embodiment, the processor 120 may identify a first communication frequency included in a primary component carrier (PCC) frequency band and a second communication frequency included in a secondary component carrier (SCC) frequency band, based on the multiple communication frequency bands, and determine (configure) a first weight to correspond to the first communication frequency and determine (configure) a second weight to correspond to the second communication frequency.

According to an embodiment, the electronic device 101 may further include at least one antenna corresponding to the multiple communication frequency bands. The processor 120 may identify a distance between the at least one antenna and the MIPI interface, and configure a weight to correspond to each of the multiple communication frequency bands, based on the identified distance.

According to an embodiment, the processor 120 may identify a bandwidth corresponding to each of the multiple communication frequency bands, and configure a weight to correspond to each of the communication frequency bands, based on the identified bandwidth.

According to an embodiment, the processor 120 may identify the MIPI frequency selected based on the first interference data and a first MIPI frequency being used, and in case that the selected MIPI frequency coincides with the first MIPI frequency, maintain the first MIPI frequency without change.

According to an embodiment, the processor 120 may identify a communication state via the communication circuit 190, and identify the first interference data between each of the communication frequency bands and each of the MIPI frequencies, based on the identified communication state.

Figure 3:
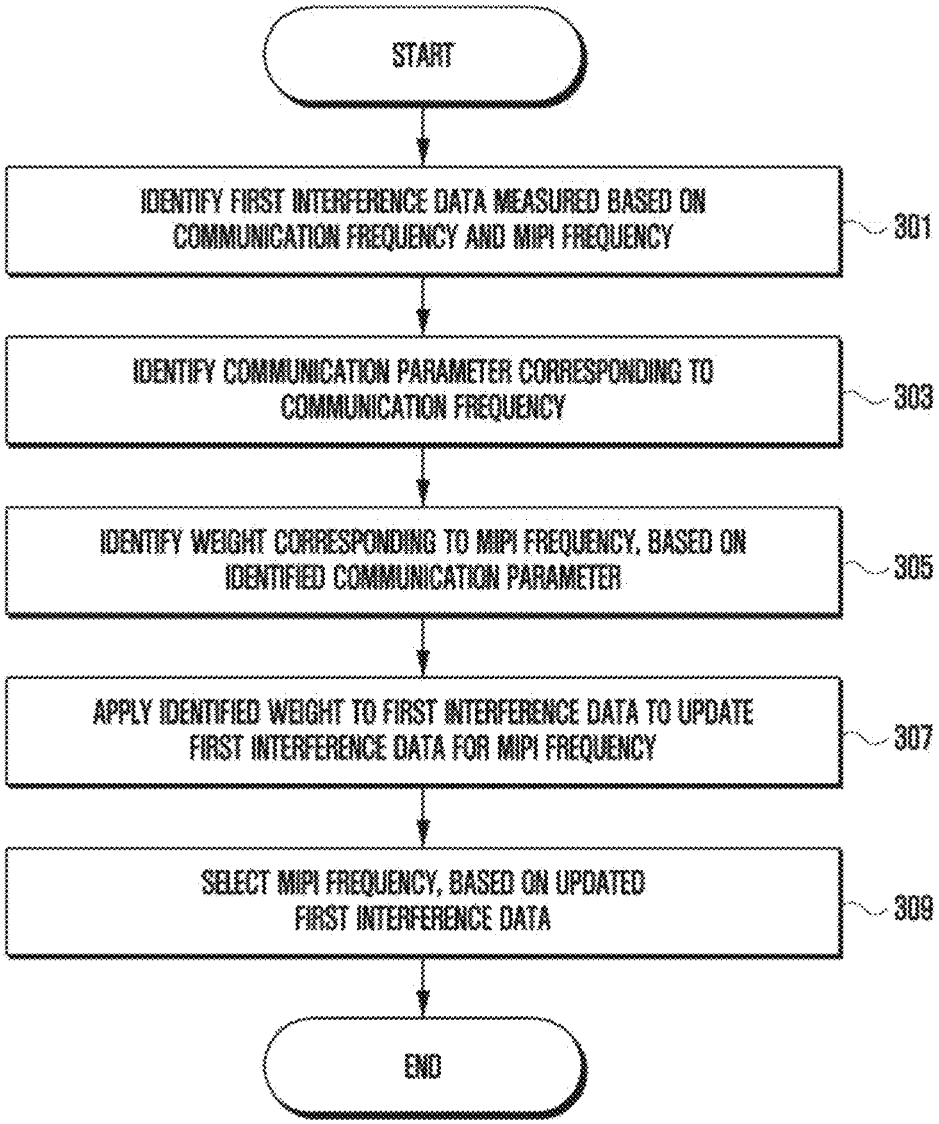
FIG. 3 illustrates a MIPI frequency selection method according to an embodiment of the disclosure.

FIG. 3 illustrates a MIPI frequency selection method according to an embodiment of the disclosure.

In the embodiment below, operations may be sequentially performed, but sequential performance is not necessarily required. For example, the sequence of operations may be changed, and at least two operations may be performed in parallel.

According to an embodiment, it may be understood that operation 301 to operation 309 are performed by a processor (e.g., the processor 120 in FIG. 1 and FIG. 2) of an electronic device (e.g., the electronic device 101 in FIG. 1 and FIG. 2).

An electronic device 101 illustrated in FIG. 3 may be at least partially similar to the electronic device 101 in FIG. 1, or may further include other embodiments of the electronic device. The electronic device 101 may simultaneously perform multiple communications, based on multiple communication frequency bands (e.g., PCC band and SCC band). While the multiple communications are being simultaneously performed, the electronic device 101 may select one MIPI frequency from among multiple MIPI frequencies, based on a condition that degradation of communication performance is minimized (e.g., a condition that optimal communication performance is implemented). For example, the electronic device 101 may, when operating (e.g., activating) internal elements (e.g., a display module (e.g., the display module 160 in FIG. 1) and a camera module (e.g., the camera module 180 in FIG. 1)), select a particular MIPI frequency, and operate a corresponding internal element, based on the selected particular MIPI frequency.

According to an embodiment, an interference amount table generated based on respective communication frequencies included in multiple communication frequency bands (e.g., PCC band and SCC band) and respective MIPI frequencies included in multiple MIPI frequencies may be stored in a memory (e.g., the memory 130 in FIG. 2) of the electronic device 101. For example, the interference amount table may include a table obtained by converting, into numerical values, interference amounts (e.g., noise levels) generated based on respective communication frequencies and respective MIPI frequencies. For example, if a first MIPI frequency is selected during communication based on a first communication frequency, a first interference amount may be generated. The interference amount table may include the first interference amount recorded to be matched to the first communication frequency and the first MIPI frequency.

In operation 301, the processor 120 of the electronic device 101 may identify first interference data measured based on a communication frequency and a MIPI frequency.

For example, the processor 120 may, based on each communication frequency in multiple communication frequency bands and each MIPI frequency corresponding to the communication frequency, measure a first interference amount (e.g., noise level) for the MIPI frequency, and identify first interference amount representing the measured interference amount. For example, interference-related information 202 related to the first interference data for a MIPI frequency selected to be matched to each communication frequency may be stored in the memory (e.g., the memory 130 in FIG. 2) of the electronic device 101. In the interference-related information 202, the first interference data measured based on each MIPI frequency selected to be matched to each communication frequency may be stored in the form of a table. The processor 120 may identify the first interference data according to selection of a particular MIPI frequency on a particular communication frequency, based on the interference amount table stored in the memory 130. For example, if a (1-1)th MIPI frequency is selected to correspond to a first communication frequency, a (1-1)th interference data may be identified, and if a (1-2)th MIPI frequency is selected to correspond to the first communication frequency, (1-2)th interference data may be identified. According to an embodiment, the electronic device 101 may measure a first interference amount, based on each communication frequency and a MIPI frequency (e.g., one MIPI frequency selected from among multiple MIPI frequencies) selected to correspond to the communication frequency, and may store, as the interference-related information 202, first interference data representing the measured first interference amount in the memory 130.

In operation 303, the processor 120 may identify a communication parameter (e.g., weight values configured to correspond to a PCC band and SCC band, a weight value configured for each RF frequency band (e.g., low band/mid band/high band), or a weight value depending on an antenna port map) corresponding to the communication frequency. For example, the memory 130 of the electronic device 101 may store communication parameter-related information 203 related to a communication environment and a communication state. The processor 120 may identify a communication parameter corresponding to each communication frequency, based on the communication parameter-related information 203 stored in the memory 130.

In operation 305, the processor 120 may identify a weight corresponding to a MIPI frequency, based on the identified communication parameter. For example, if a communication frequency is included in a PCC band, the weight may be configured to relatively raise a selection priority. On the contrary, if a communication frequency is included in an SCC band, the weight may be configured to relatively lower a selection priority. For example, RF frequency bands may be classified as a low frequency band, a mid frequency band, and a high frequency band, and respective weights may be configured to correspond to the frequency bands. In a case of the low frequency band, communication performance may be relatively more substantially degraded due to interference compared to the high frequency band. The low frequency band corresponds to a communication parameter to be preferentially considered over the high frequency band, and thus a weight therefor may be configured to be relatively high. The weight may be configured so that the low frequency band has a higher selection priority than the high frequency band. For example, different weights corresponding to respective antennas (e.g., respective communication frequencies) may be configured based on an antenna port map indicating antenna placement position. For example, an interference amount occurring between a communication frequency and a MIPI frequency may be determined based on a first position of an antenna in which a communication signal is generated, and a second position of an element (e.g., the camera module 180) corresponding to the MIPI frequency. As the first position and the second position are closer together, the interference amount caused by interference phenomena becomes more significant, and thus communication performance may be significantly degraded. If the distance between the first position and the second position is small, this corresponds to a communication parameter to be preferentially configured, the processor 120 may configure a weight allowing a selection priority to be high. On the contrary, if the distance between the first position and the second position increases, this corresponds to a communication parameter to be configured at a relatively lower priority, the processor 120 may configure a weight allowing a selection priority to be low.

According to an embodiment, the processor 120 may identify a communication parameter in relation to a MIPI frequency corresponding to a communication frequency, and identify a weight corresponding to the MIPI frequency, based on the identified communication parameter. A weight corresponding to each MIPI frequency may be differently configured.

In operation 307, the processor 120 may apply the identified weight, based on the first interference data, and update the first interference data for the MIPI frequency. For example, the processor 120 may apply the weight to the first interference data to calculate and update a rating value so that a selection priority becomes high or low. The calculated rating value may indicate the updated first interference data. The processor 120 may apply a weight based on the first interference data to update the first interference data, and select one MIPI frequency from among multiple MIPI frequencies, based on the updated first interference data.

In operation 309, the processor 120 may select a MIPI frequency, based on the updated first interference data. For example, the electronic device 101 may consider a current communication state (e.g., a communication parameter) to determine a selection priority corresponding to each MIPI frequency so as to minimize degradation of communication performance caused by interference phenomena. The electronic device 101 may apply a weight so that a selection priority for a communication frequency, which is to be preferentially considered and has a high importance level, becomes higher. The electronic device 101 may apply a weight corresponding to each communication frequency, based on the first interference data, and update the first interference data. The electronic device 101 may select a MIPI frequency according to the updated first interference data, based on a condition that optimal communication performance is implemented.

Figure 4B:
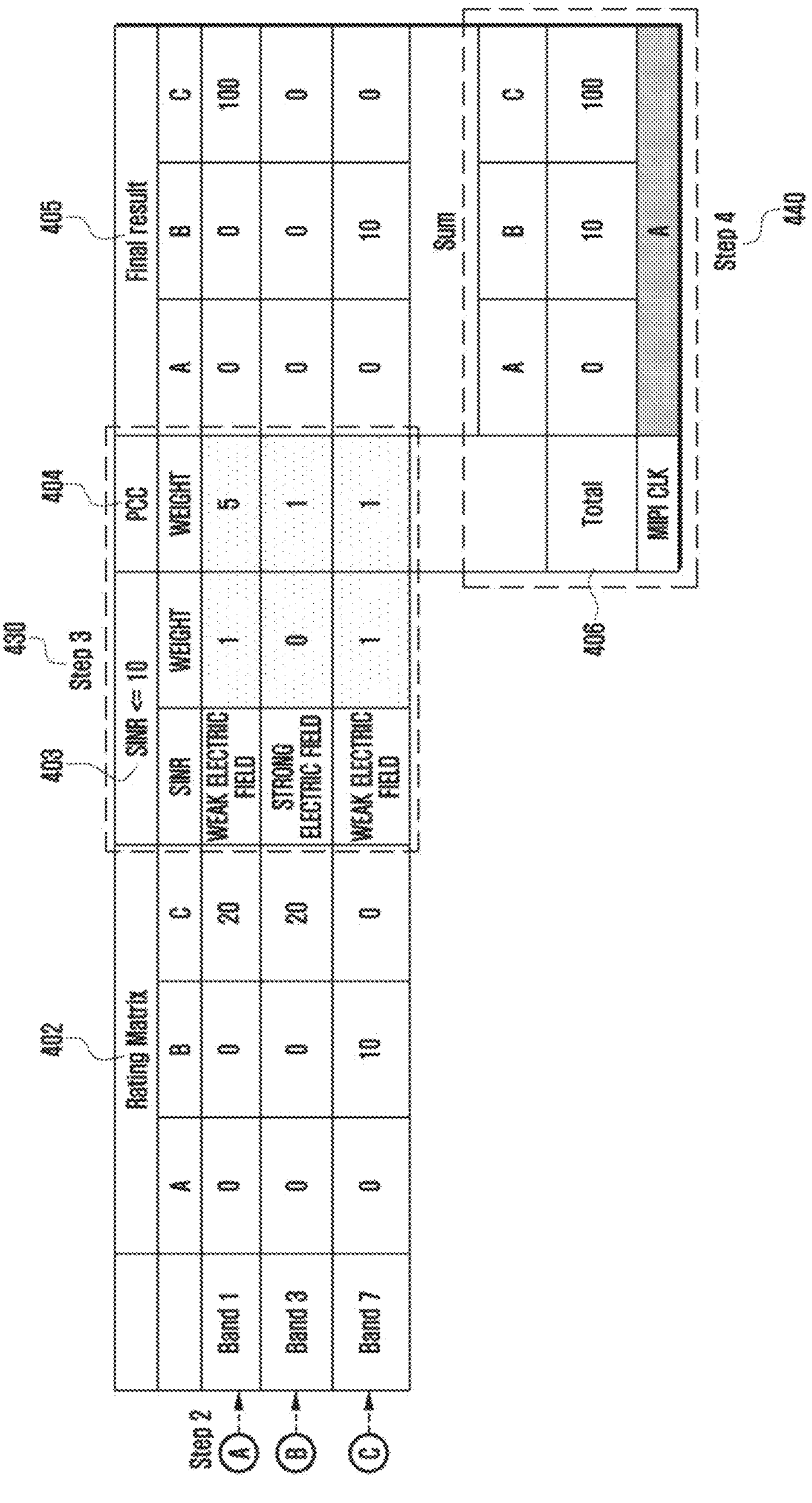
FIG. 4B illustrates an example of a second process of selecting a MIPI frequency having an excellent communication performance in multiple communication frequency bands according to an embodiment of the disclosure.

FIG. 4A is illustrates an example of a first process of selecting a MIPI frequency having an excellent communication performance in multiple communication frequency bands according to an embodiment of the disclosure. FIG. 4B illustrates an example of a second process of selecting a MIPI frequency having an excellent communication performance in multiple communication frequency bands according to an embodiment of the disclosure.

An electronic device 101 illustrated in FIG. 4A and FIG. 4B may be at least partially similar to the electronic device 101 in FIG. 1, or may further include other embodiments of the electronic device.

FIG. 4A illustrates an interference amount table 401 including first interference amounts (e.g., first interference data) measured based on multiple communication frequencies and selected MIPI frequencies. For example, the interference amount table 401 may be stored in a memory (e.g., the memory 130 in FIG. 2). According to an embodiment, a processor (e.g., the processor 120 in FIG. 2) of the electronic device 101 may measure an interference amount corresponding to each MIPI frequency among multiple MIPI frequencies (e.g., A, B, and C), based on multiple communication frequency bands (e.g., LTE communication-related frequency bands), and identify first interference data in which the interference amount is numerically calculated. For example, for a BAND 1 (e.g., BAND_091_LB01 (0-113)) communication frequency, if a MIPI frequency is selected as "C", the first interference data may be identified as about 20 dB. For example, an interference amount occurring a communication frequency and a MIPI frequency may be calculated as a numerical value in a unit of [dB] indicating how much the frequencies affect each other. An interference amount may include interference data that is numerically calculated. For example, as interference data gets greater, the interference phenomenon between a communication frequency and a MIPI frequency may be deepened, and an effect on communication performance may be substantial. According to an embodiment, in step 1 410 among processes of selecting a MIPI frequency, the processor 120 may identify first interference data corresponding to each communication frequency according to selection (e.g., A, B, and C) of a MIPI frequency, based on the interference amount table 401.

According to an embodiment, the processor 120 may select communication frequencies used in simultaneously performing multiple communications, based on multiple communication frequency bands. For example, the processor 120 may identify at least one communication frequency used as a PCC band and an SCC band, and extract at least one rating value 411, 412, or 412 (rating matrix or first interference data) corresponding to the identified communication frequency, based on the interference amount table 401. According to an embodiment, in step 2 420 among processes of selecting a MIPI frequency, the processor 120 may extract at least one rating value 411, 412, or 412 included in the interference amount table 401, based on at least one communication frequency used as a PCC band and an SCC band. For example, in step 2 420, the processor 120 may extract the rating value 411 corresponding to the 'BAND 1' communication frequency, the rating value 412 corresponding to a 'BAND 3' communication frequency (B), and the rating value 413 corresponding to a 'BAND 7' communication frequency (C).

FIG. 4B illustrates that a weight related to communication parameter (e.g., weight values configured to correspond to a PCC band and SCC band, a weight value configured for each RF frequency band (e.g., low band/mid band/high band), or a weight value depending on an antenna port map) is reflected based on the extracted rating value (rating matrix) 402 (e.g., the first interference data), and the weight (step 3 430) are reflected on a second interference amount (step 4 440) (e.g., the first interference data updated by reflecting the weight to the first interference data).

According to an embodiment, the processor 120 may determine whether to consider an interference amount between a communication frequency and a MIPI frequency, based on an identified communication state (e.g., a weak electric field or a strong electric field). For example, if the communication state is a strong electric field (e.g., a SINR 403 is greater than a configured threshold), a noise level (e.g., interference amount) occurring between a communication frequency and a MIPI frequency may have small influence on communication performance. For example, if the communication state is a strong electric field, degradation of communication performance caused by interference phenomena may not be considered. If the communication state is a strong electric field, a noise level may not be considered. Referring to FIG. 4B, a weight may be configured to be about 0 for a strong electric field, and may be configured to be about 1 for a weak electric field. If the communication state is a weak electric field, a noise level may be considered. According to an embodiment, a communication frequency in the state of a strong electric field (e.g., weight=0) may not be considered in a process of selecting a MIPI frequency.

According to an embodiment, if a communication frequency is included in a PCC band 404 among the PCC band 404 and an SCC band, a weight may be configured to relatively raise a selection priority. In comparison between the PCC band 404 and the SCC band, the communication performance in the PCC band 404 may be relatively preferentially considered. Referring to FIG. 4B, if a communication frequency is included in the PCC band 404, a weight may be configured to be about five (5), and if a communication frequency is included in the SCC band, a weight may be configured to be about one (1).

Referring to FIG. 4B, the processor 120 may reflect a weight configured in step 3 430, based on a rating value (rating matrix) (e.g., a first interference amount) 402 extracted in step 2 420, and calculate a final rating value (final result) 405. The processor 120 may sum final rating values (final results) 405 corresponding to respective communication frequencies by each MIPI frequency in step 4. The processor 120 may select the MIPI frequency "A", based on result values (total) 406 obtained by summing in step 4. According to an embodiment, the electronic device 101 may select a MIPI frequency minimizing degradation of communication performance (e.g., to implement optimal communication performance or maintain optimal communication performance)

Figure 4C:
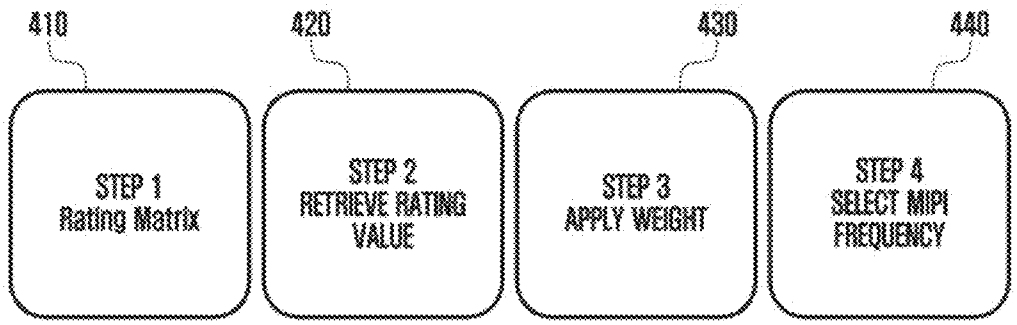
FIG. 4C illustrates an example of a full process of selecting a MIPI frequency having an excellent communication performance in multiple communication frequency bands according to an embodiment of the disclosure.

FIG. 4C illustrates an example of a full process of selecting a MIPI frequency having an excellent communication performance in multiple communication frequency bands according to an embodiment of the disclosure.

Referring to FIG. 4C, a total of four steps (e.g., step 1 410, step 2 420, step 3 430, and step 4 440) are illustrated as a process of selecting a MIPI frequency. Referring to FIG. 4A, step 1 410 and step 2 420 are illustrated, and referring to FIG. 4B, step 3 430 and step 4 440) are illustrated.

In step 1 410, the processor 120 may identify a first interference amount (e.g., rating matrix or rating value) corresponding to each communication frequency according to selection (e.g., A, B, and C) of a MIPI frequency, based on the interference amount table 401 stored in the memory 130.

In step 2 420, the processor 120 may retrieve at least one rating value 411, 412, or 412 included in the interference amount table 401, based on at least one communication frequency used as a PCC band and an SCC band.

In step 3 430, the processor 120 may apply a weight related to a communication parameter (e.g., weight values configured to correspond to a PCC band and SCC band, a weight value configured for each RF frequency band (e.g., low band/mid band/high band), or a weight value depending on an antenna port map), based on the retrieved rating value 411, 412, or 412.

In step 4 440, the processor 120 may select a MIPI frequency, based on the final rating value (final result) 405 calculated applying the weight.

According to an embodiment, the electronic device 101 may use the selected MIPI frequency to operate an element (e.g., the display module 160 or the camera module 180) included in the electronic device 101, and minimize degradation of communication performance based on a communication frequency. The electronic device 101 may calculate a final rating value considering various factors degrading communication performance, and select a MIPI frequency, based on the calculated final rating value. The electronic device 101 may select one MIPI frequency from among multiple MIPI frequencies to implement optimal communication performance in a current communication state.

Figure 5:
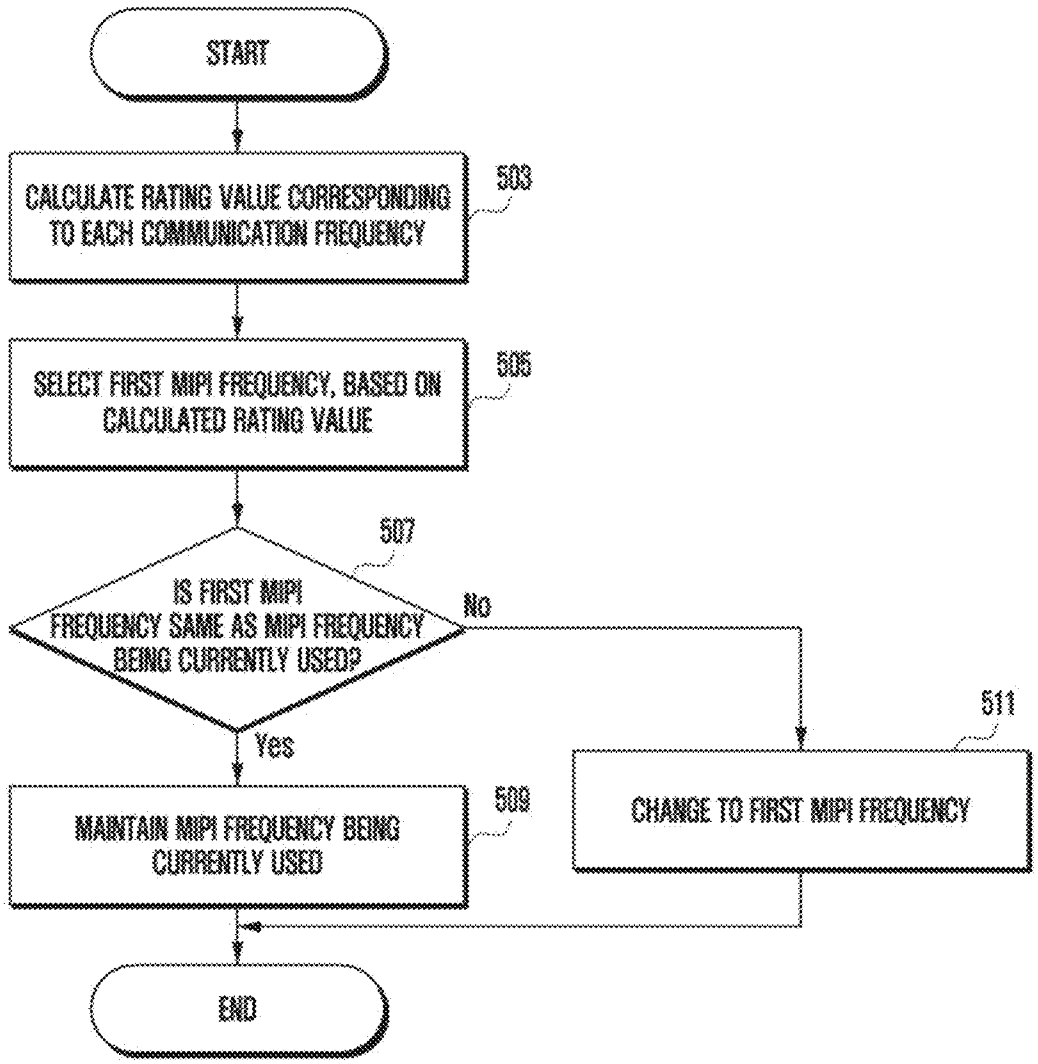
FIG. 5 illustrates operations of changing a MIPI frequency, based on a rating value according to an embodiment of the disclosure.

FIG. 5 illustrates operations of changing a MIPI frequency, based on a rating value according to an embodiment of the disclosure.

In the embodiment below, operations may be sequentially performed, but sequential performance is not necessarily required. For example, the sequence of operations may be changed, and at least two operations may be performed in parallel.

According to an embodiment, operation 501 to operation 509 are performed by a processor (e.g., the processor 120 in FIG. 1 and FIG. 2) of an electronic device (e.g., the electronic device 101 in FIG. 1 and FIG. 2).

An electronic device 101 illustrated in FIG. 5 may be at least partially similar to the electronic device 101 in FIG. 1, or may further include other embodiments of the electronic device. The electronic device 101 may search for a MIPI frequency implementing optical communication performance even in a state where an internal element is operated using a particular MIPI frequency. For example, if a second MIPI frequency is able to implement relatively superior communication performance compared to a first MIPI frequency being currently used, the electronic device 101 may change the first MIPI frequency to the second MIPI frequency.

In operation 501, the processor 120 of the electronic device 101 may calculate a rating value corresponding to each communication frequency. For example, the rating value calculated in operation 501 may include the final rating value (final result) 405 calculated in step 4 440 in FIG. 4C. The processor 120 may be operating an element by using a particular MIPI frequency.

In operation 503, the processor 120 may select a first MIPI frequency, based on the calculated rating value. For example, the processor 120 may select the first MIPI frequency minimizing degradation of communication performance caused by interference phenomena (e.g., interference phenomena having occurred between a communication frequency and a MIPI frequency) in a current communication state.

In operation 505, the processor 120 may identify whether the selected first MIPI frequency is the same as the particular MIPI frequency being currently used.

In operation 505, if the first MIPI frequency is the same as the particular MIPI frequency, the processor 120 may maintain the particular MIPI frequency being currently used, in operation 507. For example, the processor 120 may at least partially operate the internal element by using the particular MIPI frequency.

In operation 505, if the first MIPI frequency is not the same as the particular MIPI frequency, the processor 120 may change the particular MIPI frequency being currently used to the first MIPI frequency, in operation 509.

According to an embodiment, the electronic device 101 may calculate a rating value considering various factors degrading communication performance, and select a first MIPI frequency, based on the calculated rating value. If a particular MIPI frequency being currently used in a current communication state coincides with the first MIPI frequency, the electronic device 101 may maintain the particular MIPI frequency being currently used without change. According to an embodiment, the electronic device 101 may select one MIPI frequency from among multiple MIPI frequencies to implement optimal communication performance, based on a current communication state.

Figure 6:
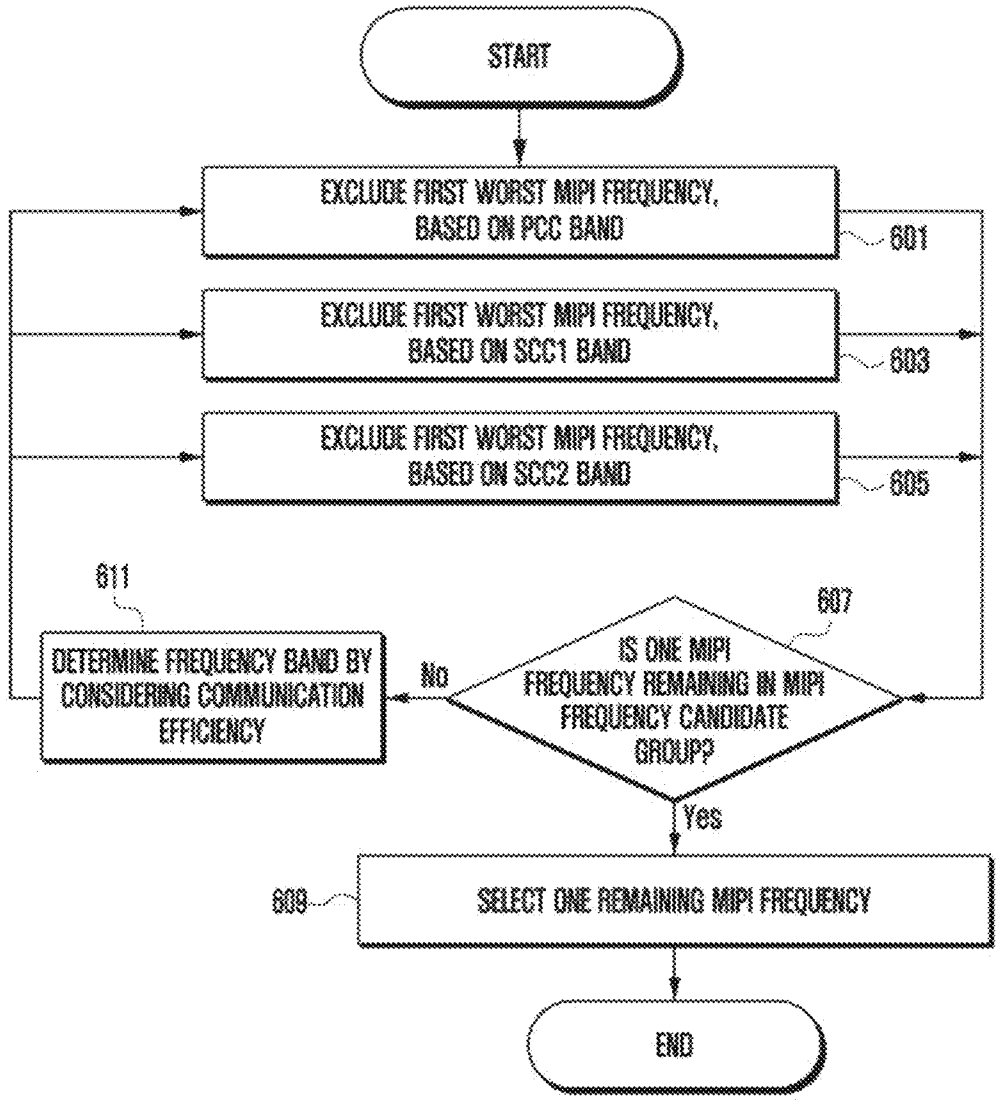
FIG. 6 illustrates a MIPI frequency selection method according to an embodiment of the disclosure.

FIG. 6 illustrates a MIPI frequency selection method according to an embodiment of the disclosure.

In the embodiment below, operations may be sequentially performed, but sequential performance is not necessarily required. For example, the sequence of operations may be changed, and at least two operations may be performed in parallel.

According to an embodiment, it may be understood that operation 601 to operation 611 are performed by a processor (e.g., the processor 120 in FIG. 1 and FIG. 2) of an electronic device (e.g., the electronic device 101 in FIG. 1 and FIG. 2).

According to an embodiment, the electronic device 101 may identify an interference amount affecting communication performance, to correspond to each of multiple communication frequencies, and select one MIPI frequency from among multiple MIPI frequencies to implement optimal communication performance.

An electronic device 101 illustrated in FIG. 6 may be at least partially similar to the electronic device 101 in FIG. 1, or may further include other embodiments of the electronic device. Referring to FIG. 6, the electronic device 101 may identify a worst MIPI frequency relatively substantially degrading communication performance, based on a MIPI frequency candidate group including multiple MIPI frequencies, in a current communication state. The electronic device 101 may exclude a MIPI frequency corresponding to the worst MIPI frequency among the multiple MIPI frequencies included in the MIPI frequency candidate group, from the MIPI frequency candidate group.

The electronic device 101 may continuously exclude a worst MIPI frequency based on a current communication state until one MIPI frequency is remaining in the MIPI frequency candidate group. If only one MIPI frequency is remaining in the MIPI frequency candidate group, the electronic device 101 may select the one remaining MIPI frequency. For example, the one remaining MIPI frequency may include a MIPI frequency generating relatively low degradation of communication performance in a current communication state.

In operation 601, the processor 120 of the electronic device 101 may exclude a first worst frequency based on a PCC band from a MIPI frequency candidate group. For example, the processor 120 may identify the first worst MIPI frequency generating the relatively greatest degradation of communication performance caused by interference phenomena, based on a communication frequency included in the PCC band, and may exclude the identified first worst MIPI frequency from the MIPI frequency candidate group.

In operation 607, the processor 120 may identify whether one MIPI frequency is remaining in the MIPI frequency candidate group. The electronic device 101 of FIG. 6 may exclude a MIPI frequency relatively substantially degrading communication performance until one MIPI frequency is remaining among MIPI frequencies included in the MIPI frequency candidate group.

If one MIPI frequency is remaining in the MIPI frequency candidate group in operation 607, the processor 120 may select the one remaining MIPI frequency in operation 609.

If one or more MIPI frequencies are remaining in the MIPI frequency candidate group in operation 607, the processor 120 may determine a frequency band by considering communication efficiency (e.g., PCC band or SCC band) in operation 611. For example, the processor 120 may determine a communication frequency band (e.g., having a high priority or having high communication efficiency) preferentially considered to perform communication. For example, if it is identified that a PCC band has a communication efficiency higher than that of an SCC band (e.g., SCC1 band and SCC2 band) in a current communication state, the processor 120 may, in operation 601, identify a first worst MIPI frequency (e.g., a MIPI frequency degrading the relatively greatest communication performance when same is selected), based on the PCC band, and exclude the first worst MIPI frequency from the MIPI frequency candidate group. For example, if it is identified that a SCC1 band has a communication efficiency higher than those of a PCC band and an SCC2 band in a current communication state, the processor 120 may, in operation 603, identify a first worst MIPI frequency (e.g., a MIPI frequency degrading the relatively greatest communication performance when same is selected), based on the SCC1 band, and exclude the first worst MIPI frequency from the MIPI frequency candidate group.

According to an embodiment, the electronic device 101 may identify a particular MIPI frequency, when selected, degrading the greatest communication performance, with respect to each of multiple MIPI frequencies included in a MIPI frequency candidate group. The electronic device 101 may exclude the particular MIPI frequency from the MIPI frequency candidate group one by one. The electronic device 101 may continuously exclude a first worst MIPI frequency degrading the greatest communication performance until one MIPI frequency is remaining in the MIPI frequency candidate group. When one MIPI frequency is remaining in the MIPI frequency candidate group, the electronic device 101 may select the one remaining MIPI frequency.

Figure 7:
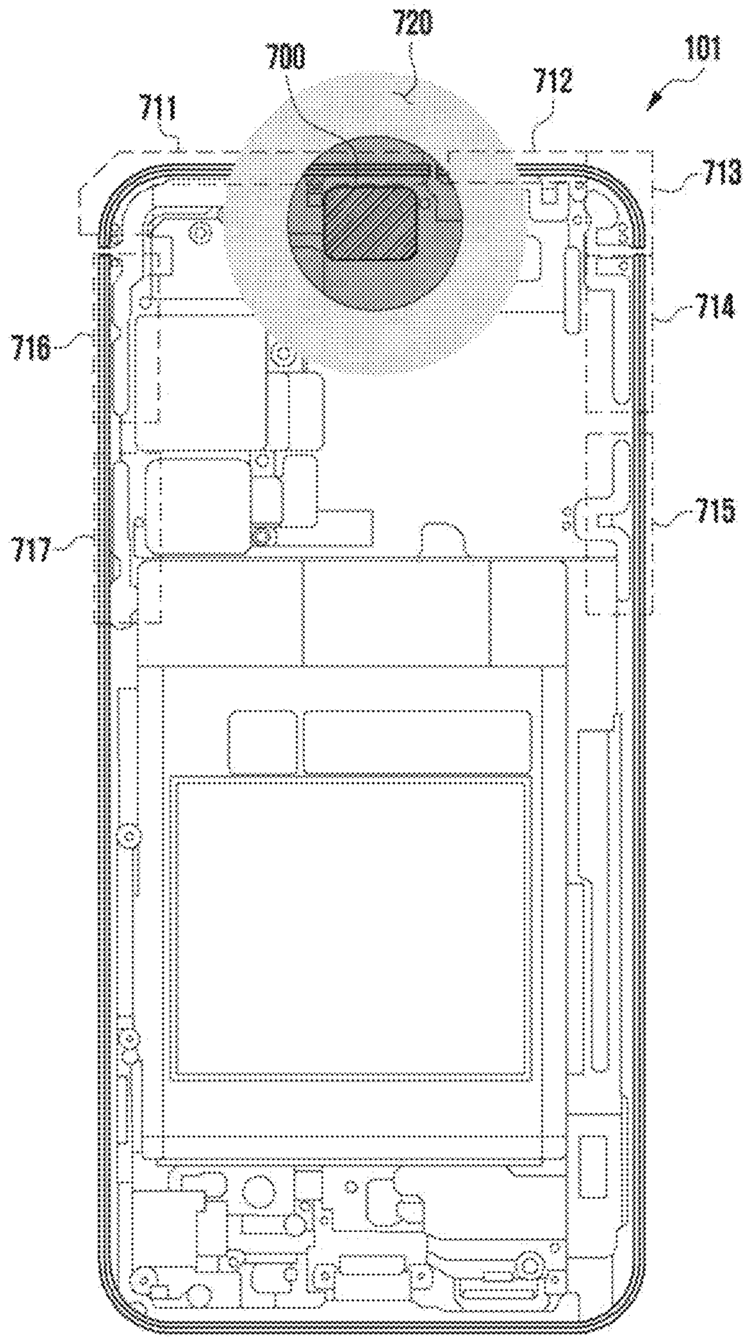
FIG. 7 illustrates an example of an antenna port map according to an embodiment of the disclosure.

FIG. 7 illustrates an example of an antenna port map according to an embodiment of the disclosure.

An electronic device 101 illustrated in FIG. 7 may be at least partially similar to the electronic device 101 in FIG. 1, or may further include other embodiments of the electronic device.

FIG. 7 illustrates a structure in which multiple antennas (e.g., antenna elements) 711, 712, 713, 714, 715, 716, and 717 are arranged in an internal space of the electronic device 101. FIG. 7 may include an antenna port map. The electronic device 101 may simultaneously perform multiple communications based on multiple communication frequency bands (e.g., PCC band and SCC band) by using the multiple antennas. A processor (e.g., the processor 120 in FIG. 2) of the electronic device 101 may select a MIPI frequency for operating an internal element (e.g., the display module 160, the camera module 180, or a VTCAM 700), while multiple communications are being simultaneously performed. For example, in an environment where a communication frequency and a MIPI frequency are simultaneously used, an interference phenomenon (e.g., noise level) may occur between the communication frequency and the MIPI frequency, and communication performance may be at least partially degraded due to the interference phenomenon.

According to an embodiment, a noise magnitude (e.g., noise level) corresponding to an interference phenomenon may be determined based on the distance between the VTCAM 700 (e.g., the camera module 180) for which a MIPI frequency is used, and an antenna for which a communication frequency is used. For example, a MIPI frequency selected for operation of the VTCAM 700 may have a bad impact (e.g., degradation of communication performance) on the communication performance of a communication frequency by a first range 720. For example, if an antenna is positioned within the first range 720, communication performance may be relatively substantially degraded.

For example, the communication performance of antennas (e.g., the first antenna 711 and the second antenna 712) arranged relatively close to the VTCAM 700 may be relatively substantially degraded due to interference phenomena. The communication performance of communication frequencies corresponding to the first antenna 711 and the second antenna 712 are substantially degraded compared to the remaining communication frequencies, and thus weights corresponding to the communication frequencies may be configured to be great. As another example, the communication performance of antennas (e.g., the third antenna 713 to the seventh antenna 717) arranged relatively far away from the VTCAM 700 may be relatively slightly degraded due to interference. The communication performance of communication frequencies corresponding to the third antenna 713 to the seventh antenna 717 are slightly degraded compared to the other communication frequencies (e.g., the communication frequencies corresponding to the first antenna 711 and the second antenna 712), and thus weights corresponding to the communication frequencies may be configured to be small.

According to an embodiment, the electronic device 101 may identify the distances (e.g., an area) between an element (e.g., VTCAM 700) for which a MIPI frequency is used and the multiple antennas, based on the antenna port map, and may differently configure weights corresponding to multiple communication frequencies. For example, at least one antenna (e.g., the first antenna 711 and the second antenna 712) positioned within the first range 720 with respect to the VTCAM 700 exhibits relatively substantial degradation of communication performance, and thus a weight may be configured to be relatively high. As another example, at least one antenna (e.g., the third antenna 713 to the seventh antenna 717) positioned out of the first range 720 with respect to the VTCAM 700 exhibits relatively small degradation of communication performance, and thus a weight may be configured to be relatively small.

According to an embodiment, the electronic device 101 may reflect a weight configured according to a communication parameter, on a first interference amount corresponding to each of multiple communication frequencies, and calculate a second interference amount reflecting the weight. The electronic device 101 may select one MIPI frequency from among the multiple MIPI frequencies according to the calculated second interference amount, based on a condition that optimal communication performance is implemented.

A MIPI frequency selection method according to an embodiment may include identifying first interference data representing an interference amount between each of multiple communication frequency bands and each of MIPI frequencies, identifying a weight corresponding to each of the MIPI frequencies, based on a communication parameter related to wireless communication for each of the multiple communication frequency bands, updating the first interference data for each of the MIPI frequencies, based on the identified weight, and selecting a MIPI frequency for operating an MIPI interface, based on the first interference data updated based on the weight.

The identifying of the first interference data according to an embodiment may include identifying a multiplied component corresponding to each of the MIPI frequencies, identifying a weight configured to correspond to the identified multiplied component, and identifying the first interference data to which the configured weight has been applied based on a communication frequency band corresponding to the multiplied component.

The method according to an embodiment may further include applying a relatively greater weight, based on a communication frequency band corresponding to a relatively greater multiplied component. In an embodiment, the method may further include identifying a first multiplied component corresponding to a first MIPI frequency of the multiple MIPI frequencies; identifying a second multiplied component corresponding to a second MIPI frequency of the multiple MIPI frequencies; and applying a first weight, based on a first communication frequency band corresponding to the first multiplied component, wherein the first multiplied component is greater than the second multiplied component, and wherein the first weight is greater than a second weight to be applied based on a second communication frequency band corresponding to the second multiplied component.

The method according to an embodiment may further include identifying an even-multiplied value and an odd-multiplied value included in the multiplied component, identifying a first weight configured based on the identified even-multiplied value and a second weight configured based on the identified odd-multiplied value, and applying the first weight to correspond to a first communication frequency band corresponding to the even-multiplied value and applying the second weight to correspond to a second communication frequency band corresponding to the odd-multiplied value.

The identifying of the first interference data according to an embodiment may include generating an interference amount table in a form of a table, based on each of the communication frequencies and each of the MIPI frequencies, and identifying the first interference data, based on the interference amount table.

The method according to an embodiment may further include identifying a first communication frequency included in a primary component carrier (PCC) frequency band and a second communication frequency included in a secondary component carrier (SCC) frequency band, based on the multiple communication frequency bands, and configuring a first weight to correspond to the first communication frequency and configuring a second weight to correspond to the second communication frequency.

The method according to an embodiment may further include identifying an distance between at least one antenna corresponding to the multiple communication frequency bands and the MIPI interface, and determining (configuring) a weight corresponding to each of the multiple communication frequency bands, based on the identified distance.

The method according to an embodiment may further include identifying the MIPI frequency selected based on the first interference data and a first MIPI frequency being used, and in case that the selected MIPI frequency coincides with the first MIPI frequency, maintaining the first MIPI frequency without change.

The identifying of the first interference data according to an embodiment may include identifying a communication state via a communication circuit 190, and identifying the first interference data between each of the communication frequency bands and each of the MIPI frequencies, based on the identified communication state.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
- a communication circuit configured to perform a wireless communication using multiple communication frequency bands;
- at least one memory configured to comprise information related to multiple mobile industry processor interface (MIPI) frequencies;
- at least one processor operatively connected to the communication circuit and the at least one memory; and
- an internal circuit connected to the at least one processor via a MIPI interface,
- wherein the at least one processor is configured to:
  - identify first interference data representing an interference amount between each of the multiple communication frequency bands and each of the MIPI frequencies,
  - identify a weight corresponding to each of the multiple MIPI frequencies, based on a communication parameter related to the wireless communication for each of the multiple communication frequency bands,
  - update the first interference data for each of the MIPI frequencies, based on the identified weight, and
  - select a MIPI frequency for operating the MIPI interface, based on the updated first interference data.

2. The electronic device of claim 1, wherein the at least one processor is further configured to:
- identify a multiplied component corresponding to each of the multiple MIPI frequencies,
- identify a weight corresponding to the identified multiplied component, and
- identify the first interference data to which the identified weight is applied based on a communication frequency band corresponding to the multiplied component.

3. The electronic device of claim 1, wherein the at least one processor is further configured to:
- identify a first multiplied component corresponding to a first MIPI frequency of the multiple MIPI frequencies,
- identify a second multiplied component corresponding to a second MIPI frequency of the multiple MIPI frequencies, and
- apply a first weight, based on a first communication frequency band corresponding to the first multiplied component,
- wherein the first multiplied component is greater than the second multiplied component, and
- wherein the first weight is greater than a second weight to be applied based on a second communication frequency band corresponding to the second multiplied component.

4. The electronic device of claim 2, wherein the at least one processor further is configured to:
- identify an even-multiplied value and an odd-multiplied value in the multiplied component,
- identify a first weight configured based on the identified even-multiplied value and identify a second weight configured based on the identified odd-multiplied value, and
- apply the first weight corresponding to a first communication frequency band corresponding to the even-multiplied value and apply the second weight corresponding to a second communication frequency band to the odd-multiplied value.

5. The electronic device of claim 2, wherein the first interference data comprises a noise level interfering between each of the multiple communication frequency bands and each of the MIPI frequencies.

6. The electronic device of claim 2, wherein the at least one processor is further configured to:
- generate an interference amount table, based on each of the communication frequency band and each of the MIPI frequencies, and
- identify the first interference data, based on the interference amount table.

7. The electronic device of claim 1, wherein the at least one processor is further configured to:
- identify a first communication frequency in a primary component carrier (PCC) frequency band and a second communication frequency in a secondary component carrier (SCC) frequency band, based on the multiple communication frequency bands, and
- determine a first weight corresponding to the first communication frequency and determine a second weight corresponding to the second communication frequency.

8. The electronic device of claim 1, further comprising at least one antenna corresponding to the multiple communication frequency bands,
- wherein the at least one processor is further configured to:
  - identify a distance between the at least one antenna and the MIPI interface, and determine a weight corresponding to each of the multiple communication frequency bands, based on the identified distance.

9. The electronic device of claim 1, wherein the at least one processor is further configured to:

identify a bandwidth corresponding to each of the multiple communication frequency bands, and determine a weight corresponding to each of the multiple communication frequency bands, based on the identified bandwidth.

10. The electronic device of claim 1, wherein the at least one processor is further configured to:

identify the MIPI frequency selected based on the first interference data and a first MIPI frequency, and based on the selected MIPI frequency that coincides with the first MIPI frequency, maintain the first MIPI frequency.

11. The electronic device of claim 1, wherein the at least one processor is further configured to:

identify a communication state via the communication circuit, and identify the first interference data between each of the multiple communication frequency bands and each of the MIPI frequencies, based on the identified communication state.

12. A method for selecting a mobile industry processor interface (MIPI) frequency, the method comprising:

identifying first interference data representing an interference amount between each of multiple communication frequency bands and each of MIPI frequencies;

identifying a weight corresponding to each of the MIPI frequencies, based on a communication parameter related to a wireless communication for each of the multiple communication frequency bands;

updating the first interference data for each of the MIPI frequencies, based on the identified weight; and selecting the MIPI frequency for operating an MIPI interface, based on the updated first interference data.

13. The method of claim 12, wherein the identifying the first interference data comprises:

identifying a multiplied component corresponding to each of the MIPI frequencies;

identifying a weight corresponding to the identified multiplied component; and identifying the first interference data to which the identified weight is applied based on a communication frequency band corresponding to the identified multiplied component.

14. The method of claim 12, further comprising:

identifying a first multiplied component corresponding to a first MIPI frequency of the multiple MIPI frequencies;

identifying a second multiplied component corresponding to a second MIPI frequency of the multiple MIPI frequencies; and applying a first weight, based on a first communication frequency band corresponding to the first multiplied component, wherein the first multiplied component is greater than the second multiplied component, and wherein the first weight is greater than a second weight to be applied based on a second communication frequency band corresponding to the second multiplied component.

15. The method of claim 13, further comprising:

identifying an even-multiplied value and an odd-multiplied value in the multiplied component;

identifying a first weight determined based on the identified even-multiplied value and identifying a second weight determined based on the identified odd-multiplied value; and applying the first weight corresponding to a first communication frequency band corresponding to the even-multiplied value and applying the second weight corresponding to a second communication frequency band to the odd-multiplied value.

16. The method of claim 12, wherein the identifying the first interference data comprises:

generating an interference amount table, based on each of the multiple communication frequency bands and each of the MIPI frequencies; and identifying the first interference data, based on the interference amount table.

17. The method of claim 12, further comprising:

identifying a first communication frequency in a primary component carrier (PCC) frequency band and a second communication frequency in a secondary component carrier (SCC) frequency band, based on the multiple communication frequency bands; and determining a first weight corresponding to the first communication frequency and determining a second weight corresponding to the second communication frequency.

18. The method of claim 12, further comprising:

identifying a distance between at least one antenna corresponding to the multiple communication frequency bands and the MIPI interface; and determining a weight corresponding to each of the multiple communication frequency bands, based on the identified distance.

19. The method of claim 12, further comprising:

selecting the MIPI frequency based on the first interference data and a first MIPI frequency being used; and based on the selected MIPI frequency that coincides with the first MIPI frequency, maintaining the first MIPI frequency.

20. One or more non-transitory computer-readable storage media storing one or more computer programs including computer-executable instructions that, when executed by one or more processors of an electronic device, cause the electronic device to perform operations, the operations comprising:

identifying first interference data representing an interference amount between each of multiple communication frequency bands and each of MIPI frequencies;

identifying a weight corresponding to each of the MIPI frequencies, based on a communication parameter related to a wireless communication for each of the multiple communication frequency bands;

updating the first interference data for each of the MIPI frequencies, based on the identified weight; and selecting the MIPI frequency for operating an MIPI interface, based on the updated first interference data.

* * * * *